United States Patent [19]

Maresca

[11] Patent Number: 4,772,838
[45] Date of Patent: Sep. 20, 1988

[54] TRI-STATE SWITCHING CONTROLLER FOR RECIPROCATING LINEAR MOTORS

[75] Inventor: Robert L. Maresca, Ossining, N.Y.

[73] Assignee: North American Philips Corporation, New York, N.Y.

[21] Appl. No.: 75,711

[22] Filed: Jul. 17, 1987

Related U.S. Application Data

[63] Continuation of Ser. No. 876,544, Jun. 20, 1986, Pat. No. 4,698,576.

[51] Int. Cl.$^4$ ............................................. G05B 11/00
[52] U.S. Cl. ................................... 318/687; 318/135; 310/27
[58] Field of Search ................... 318/135, 687; 310/27

[56] References Cited

U.S. PATENT DOCUMENTS 4,381,478 4/1983 Sano et al. ........................... 318/135
4,461,984 7/1984 Whitaker et al. .................... 318/687

*Primary Examiner*—William M. Shoop, Jr.
*Assistant Examiner*—Saul M. Bergmann
*Attorney, Agent, or Firm*—Thomas A. Briody; David R. Treacy; Bernard Franzblau

[57] ABSTRACT

A nonlinear control system adapted to drive and control the speed, stroke, phase and center position of a reciprocating linear motor by means of phase locked loop techniques and the electromechanical filtering properties of linear motors. The control system comprises a tri-state switching amplifier in conjunction with 3 distinct feedback control loops to accurately determine the amplitude, center position and phase of the motor. The first feedback control loop includes a low pass averaging circuit and compares the motor position with a reference signal to achieve the desired motor position. The second feedback control loop includes a peak detector and determines the stroke of the reciprocating motor. The third feedback control loop operates as a phase locked loop to control the phase of the motor. The control system provides high efficiency, high reliability and low cost.

3 Claims, 7 Drawing Sheets

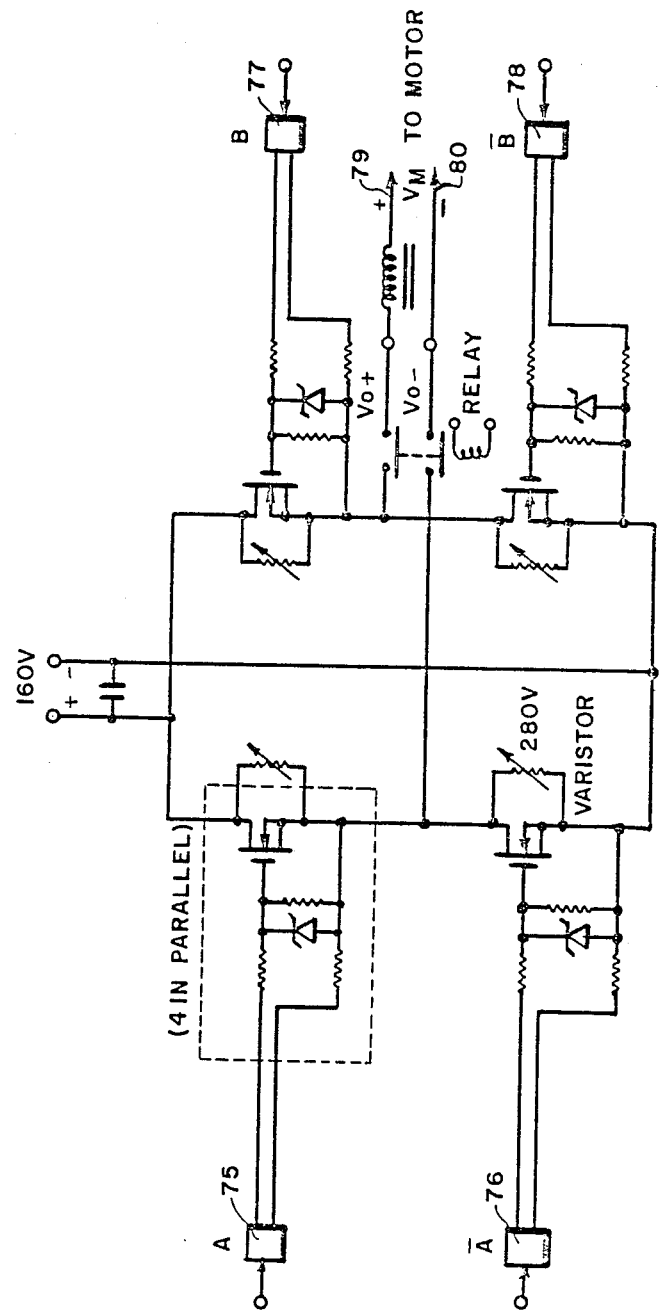
FIG.3C POWER SWITCHES

TRI-STATE SWITCHING CONTROLLER FOR RECIPROCATING LINEAR MOTORS

This is a continuation application Ser. No. 876,544 filed June 20, 1986 now U.S. Pat. No. 4,698,576.

BACKGROUND OF THE INVENTION

This invention relates to a control system for a reciprocating linear motor and, more particularly, to a high efficiency tri-state switching controller for a reciprocating linear motor.

In certain industrial applications linear motors have been found to have important advantages over the more conventional rotary motor. One such application is in the compressors of cryogenic refrigerators where the extremely low temperatures (20°–60° K.) cause condensation of any impurities in the helium working gas. In order to ensure the purity of the helium, the use of lubricants is prohibited which severely reduces the life of conventional apparatus necessary to produce linear motion. This is particularly true in the case where cryogenic refrigerators are used in a remote and inaccessible area, such as outer space.

It is customary to produce linear motion by means of a conventional rotary motor in conjunction with a mechanical to linear converter. The mechanical parts of these devices are subject to wear and thus limit the useful life of the apparatus. In addition, the use of such devices in environmental extremes makes it difficult for the motor seals and other critical elements to function properly, thereby causing equipment failure. Linear motors were therefore developed to alleviate the problems inherent in conventional rotary to linear conversion devices. For background, see U.S. Pat. No. 4,389,849 (6/28/83).

Axial control of reciprocating linear motors is typically accomplished utilizing conventional servo loop control techniques which employ an LVDT (Linear Variable Displacement Transducer) axial position sensor, a PID (Proportional-Integral-Derivative) controller and a high frequency switching amplifier. A 70% efficient 100 KHz switching amplifier has been used in a 75 Hz bandwidth classical control loop to sinusoidally drive a 400 watt piston compressor at 25 Hz. The relatively low bandwidth of the control system (limited by the bandwidth of the position sensor and the motor) resulted in a steady state amplitude control that was only marginally adequate and a less than adequate phase control at 25 Hz. The system reliability and efficiency was inadequate for use in a long life Stirling cycle cooler to be used in space missions.

SUMMARY OF THE INVENTION

An object of the invention is to provide a new axial control system to drive and control the amplitude, phase, speed and center position of a reciprocating linear motor so as to provide very high efficiency, high reliability and low cost.

Another object of the invention is to provide a tri-state switching controller that improves the steady state control, the efficiency and reliability of reciprocating linear motor compressor systems in Stirling-cycle cryogenic refrigerators.

A further object of the invention is to provide a control system for space applications that provides better regulation of steady state operating parameters, high efficiency, and greater reliability and reduced weight due to significantly reduced complexity of the control system.

The above objects of the invention are achieved by the provision of a novel non-linear control system which makes use of phase locked loop techniques and the electromechanical filtering properties of linear motors. The control system comprises a low frequency tri-state switching circuit (amplifier), a linear motor, an axial position sensor and three distinct feedback loops providing peak-amplitude feedback, average-position feedback and phase feedback.

The switching amplifier used in the control system produces a switching waveform at the desired reciprocating frequency of the linear motor. The AC component, the DC component and the phase of this waveform are controlled by three separate inputs to the switching amplifier. The amplitude of the fundamental component of the switching waveform is varied by a common mode modulation of the positive and negative pulse width. The level of the DC component of the waveform is varied by a differential modulation of the positive and negative pulse widths. The phase and frequency of the switching waveform are prescribed by an AC signal applied to a third input of the amplifier.

Three control lines are used in three distinct feedback control loops to accurately prescribe the amplitude, center position and phase of a reciprocating linear motor. The first control loop includes a low-pass averaging circuit to feed back the DC position of the motor and compare it with a DC reference signal. The resultant error signal is then compensated and used to adjust the DC component of the amplifier output voltage ($V_m$) to achieve the desired DC position of the motor piston.

The second feedback control loop includes a peak-to-peak detector in order to determine the stroke of the reciprocating motor. In the second control loop the stroke amplitude is compared to a reference signal and the resultant error signal is compensated and used to adjust the AC component of $V_m$ to achieve the desired stroke of the motor. The third control loop utilizes a phase locked loop to control the phase of the motor. A clock signal provides the frequency and phase reference to which the motor phase is locked via the phase locked loop.

The tri-state switching controller utilizes a significantly different approach to the control of the motor piston in that it uses a tri-state switching waveform rather than a sinusoidal or two-state PWM waveform to drive the linear motor. In the case of a DC voltage source providing voltages of $+V_{cc}$ and $-V_{cc}$, the output voltage switching waveform exhibits three possible states, $+V_{cc}$, 0 volts, or $-V_{cc}$.

An important advantage of this control system is that the switching frequency of the amplifier is very low, i.e. synchronous with the operating frequency of the reciprocating motor (e.g. 10–200 Hz). As a result, the design of the amplifier is simplified and requires fewer components, which in turn provides higher reliability and lower cost. Furthermore, at these frequencies the switching losses are negligible and transistors can be easily paralleled to achieve very high efficiencies. The low frequency switching makes possible the use of microprocessor control for each switching event.

Accordingly, a further object of the invention is to provide a control system having improved amplitude stability and phase control.

BRIEF DESCRIPTION OF THE DRAWING

The foregoing and other objects and advantages of the invention will become apparent by reference to the following detailed description taken in conjunction with the accompanying drawings in which:

Referring to FIG. 1 there is shown a non-linear control system in accordance with the invention which is employed to control and drive a linear motor 10, more particularly to control the critical operating parameters such as speed, stroke, phase and center position of the linear motor (e.g. a moving magnet linear motor). An LVDT axial position sensor (not shown) which is a part of the motor system 10 provides a position signal (z) on an output line 11. In the case of a piston compressor driven by a linear electric motor, the position signal z represents the position of the piston.

In the design of a control system for a cryogenic refrigerator, one must take account of the mass of the piston ($M_p$), the effective gas spring ($K_{gas}$), the thermodynamic load ($D_{load}$), and the piston blow-by ($D_{leak}$). The analysis required to calculate these values can be summarized as follows.

The mass of the piston ($M_p$) is easily calculated and simply represents the piston inertia. The effective gas spring ($K_{gas}$) represents the restoring force which the compressed gas exerts on the piston during compression and expansion. The thermodynamic load ($D_{load}$) represents the mechanical power which the piston delivers to the reversible thermodynamic cycle which enable the refrigerator to pump heat from a low temperature reservoir (e.g. 65° K.) to a high temperature reservoir (300° K.). The piston blow-by ($D_{leak}$) represents the gas leakage past the piston during compression and expansion.

Initially, an electric analog model of the linear motor and compressor system was developed. The magnitude and phase of the desired transfer function, $z/V_m(s)$, was determined, where z is the position of the piston and $V_m$ is the input voltage to the motor. A classical control system did not provide adequate control because of the departure of the actual system from the ideal electric analog thereof. For example, the motor stator and armature are encased in titanium cans which act as shorted turns on a transformer and thus modify the aforesaid electric analog.

The effect of the titanium cans is an added phase shift between motor current and position. Current feedback was ineffective to eliminate the phase shift from the motor inductance. The attempted use of a classical control system approach resulted in an amplification of noise which ultimately limited the gain of the control system. Errors in steady-state amplitude and phase were excessive.

Figure 1:
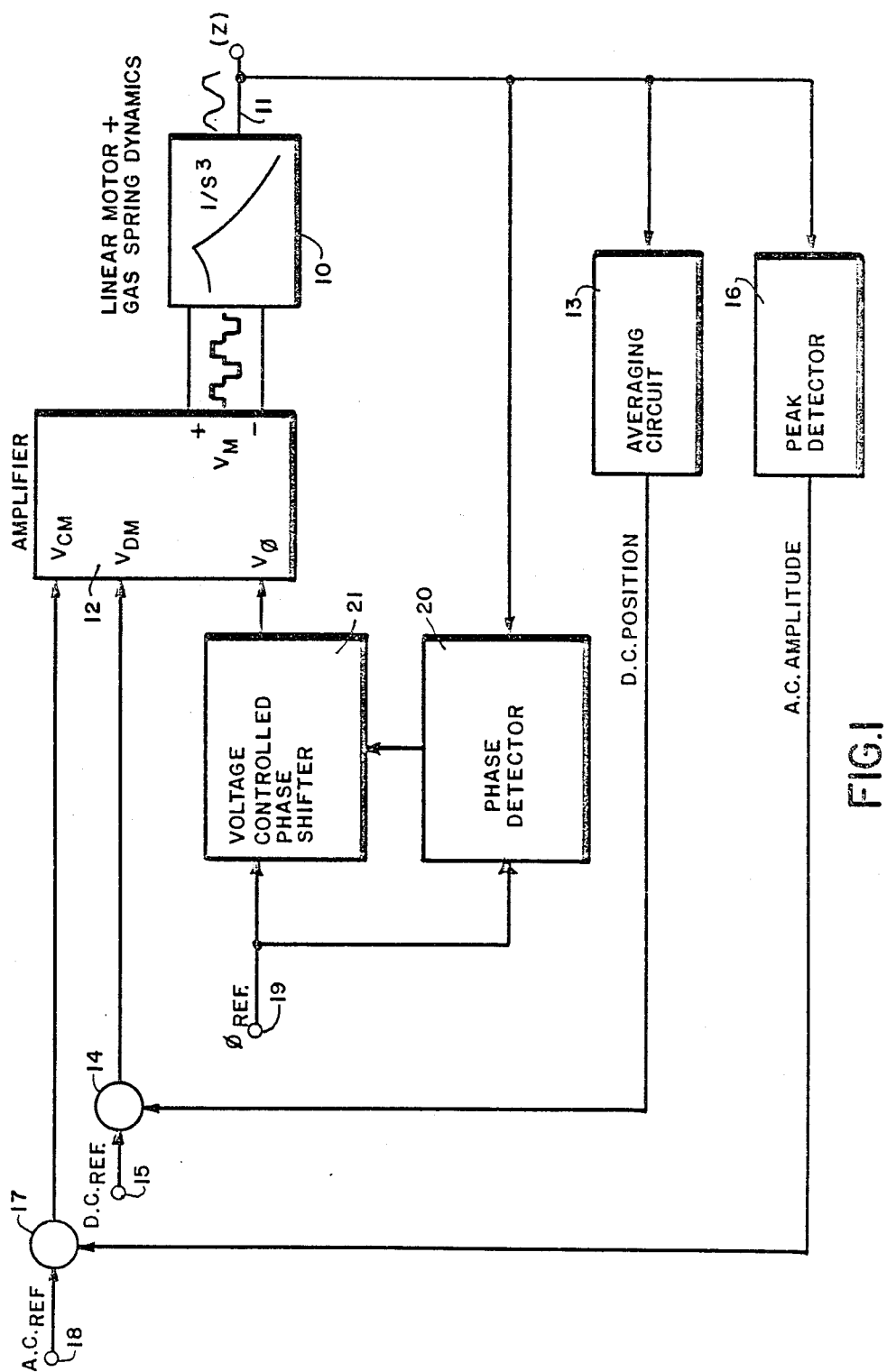
FIG. 1 is a block diagram of the tri-state switching controller in accordance with the invention.

The low frequency tri-state switching control system of FIG. 1 overcame the above and other deficiencies of the classical control system. In this control system, control of the piston involves the use of a tri-state switching waveform, as shown at the output $V_m$ of the switching amplifier 12, rather than a sinusoidal waveform, to drive the linear motor 10.

The output voltage waveform consists of a switching waveform with three possible states, i.e. $+V_{cc}$, 0 Volts or $-V_{cc}$, where $V_{cc}$ is the DC supply voltage. The fundamental frequency of this waveform may be, for example, 25 Hz. The characteristics of this switching waveform are determined by the three inputs to the amplifier 12, $V_{CM}$, $V_{DM}$ and $V_\phi$. The $V_{CM}$ input controls the amplitude of the 25 Hz fundamental, the $V_{DM}$ input controls the DC component, and the $V_\phi$ input controls the phase of the waveform.

Figure 4:
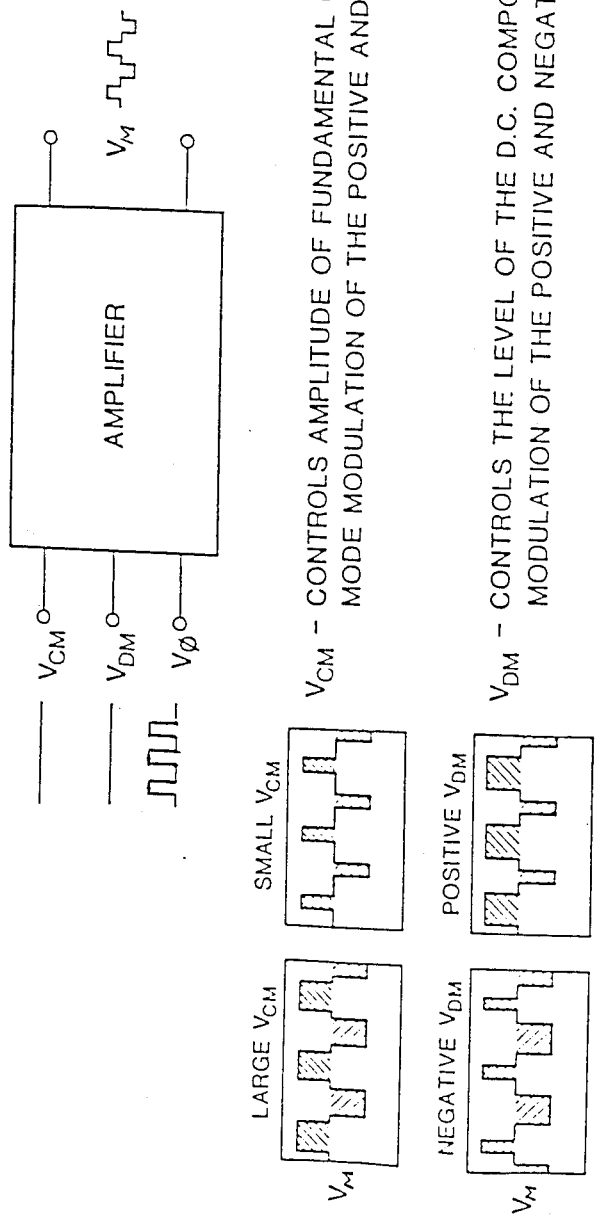
FIG. 4 illustrates the pulse width modulation of the tri-state switching waveform.

The signal at the $V_{CM}$ input controls the amplitude of the fundamental component of the switching waveform by a common mode modulation of the pulse width of both the positive and negative portions of the waveform (see FIG. 4). The signal at the $V_{DM}$ input controls the level of the DC component of the tri-state switching waveform by a differential modulation of the positive and negative pulse widths (see FIG. 4). The input $V_\phi$ receives an AC signal (rectangular waveform) at the motor operating frequency which prescribes the phase of the switching waveform.

The three distinct control loops in FIG. 1 accurately prescribe the amplitude, center position and phase of the reciprocating linear motor 10. The first control loop includes a low-pass averaging circuit 13 which is operative to feed back the DC position of the motor and compare it in a conventional subtraction circuit 14 with a DC reference signal at the terminal 15. The resultant error signal is applied to the $V_{DM}$ input of the switching amplifier. The $V_{DM}$ error signal is compensated and used to adjust the DC component of the switching waveform, $V_m$, to achieve the desired DC position of the motor.

The second control loop includes a peak-to-peak detector 16 to determine the stroke amplitude of the reciprocating motor. The AC (stroke) amplitude signal at the output of the peak detector 16 is compared in a second subtraction device 17 with an AC reference signal at terminal 18. The resultant error signal is compensated and used in amplifier 12 to adjust the AC component of the output waveform ($V_m$) to achieve the desired stroke of the motor.

A third control loop is provided to control the phase of the motor. In this third feedback control loop the phase of the motor position waveform is compared to a reference waveform $\phi REF$ and $V_\phi$ is adjusted to lock the phase of the piston onto the phase of the reference waveform. A rectangular shaped clock signal ($\phi$ REF) is applied to terminal 19 and provides the frequency and phase reference to which the motor phase is locked by means of a phase detector 20 and a voltage controlled phase shifter 21 which cooperate together to function as a phase locked loop.

The phase detector 20 receives the sinusoidal position signal on output line 11 at one input and the $\phi$ REF clock signal at a second input. The voltage controlled phase shifter 21 receives the reference clock signal at a first input and the output signal of the phase detector at a second input. The output of the phase shifter is connected to the $V_\phi$ input of the tri-state switching amplifier 12.

The control system of FIG. 1 comprises three distinct feedback loops that provide peak-amplitude feedback, average-position feedback and phase feedback. This control system regulates the speed, stroke, phase and center position of the piston. The tri-state switching waveform is determined by the three inputs to the controller. The $V_{CM}$ input controls the amplitude of the 25

Hz fundamental, the $V_{DM}$ input controls the DC component and the $V_\phi$ input controls the phase of the switching waveform. The control concept embodied therein differs significantly from conventional classical servo control in that a limit-cycle oscillator with non-linear feedback is provided rather than a stable classical control system.

The tri-state switching driver amplifier provides clear advantages as to simplicity and efficiency. The switching frequency (e.g. 25 Hz) is very low compared to 100 KHz switches previously used. Consequently, switching losses are neglegible. Furthermore, since the switching speeds are slow, relatively simple drive circuitry can be used to drive the power switches.

It can be shown, from a model of the motor piston system and the transfer function $z/V_m(s)$, that the system has a resonant peak, albeit a fairly low Q. It is an object of the control system to excite the resonance to a desired amplitude by measuring the peak-to-peak amplitude and adjusting the common mode pulse width to achieve the commanded amplitude. The average position of the piston is measured and used to adjust the differential mode pulse width to achieve the commanded DC position of the piston. The phase of the position signal waveform is compared to a reference waveform and $V_\phi$ is adjusted to lock the piston onto the phase of the reference waveform. The control system also works with non-resonant systems.

The three control loops are all low bandwidth (1 to 2 Hz), well damped and independent (uncoupled).

Figure 2:
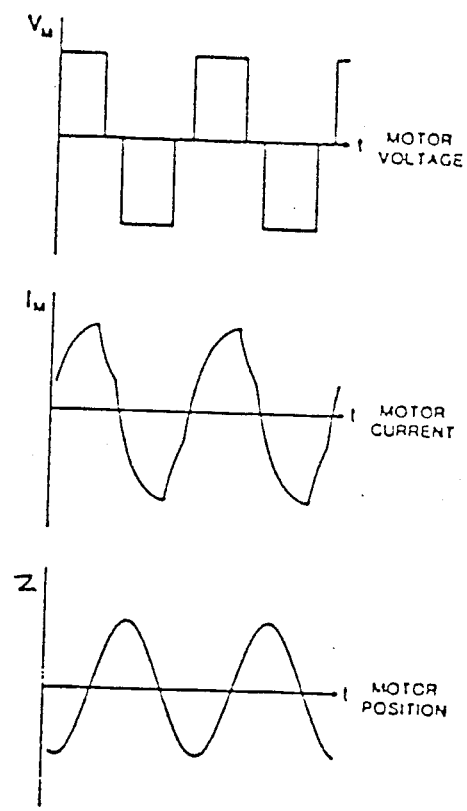
FIG. 2 illustrates some characteristic waveforms of motor voltage, current and position, FIGS. 3a–3d provide a detailed schematic diagram of the controller of FIG. 1.

This new control system was tested on a 400 W reciprocating piston compressor. Efficiencies of greater than 90% were achieved along with excellent control of the critical operating parameters, i.e. speed, stroke, phase and center position of the linear motor (of the characteristic waveforms of motor voltage, current and position in FIG. 2). Steady-state errors of less than 1% were achieved with transient response times on the order of one second.

The motor voltage exhibited a harmonic content which causes a relatively small reduction in efficiency and a small amount of harmonic distortion of the position waveform which is reduced due to the filtering properties of the motor/piston system.

The transfer function of the motor/piston system is similar to a 3-pole, low pass, filter with some peaking at 25 Hz. The effect of this filter is that the 25 Hz fundamental component of the voltage waveform produces a 25 Hz sinusoidal motion of the motor, while the higher harmonics of the voltage waveform are significantly attenuated and result in a harmonic distortion of the position waveform of less than 2% of the fundamental. The largest harmonic component of the motor current is the third harmonic and is 20db below the fundamental. Therefore, the wasted power ($I^2R$) due to the third harmonic is only 1% of the power at the fundamental. The total power dissipated in all of the higher harmonic currents was about 3% of the power at the fundamental.

Figure 3A:
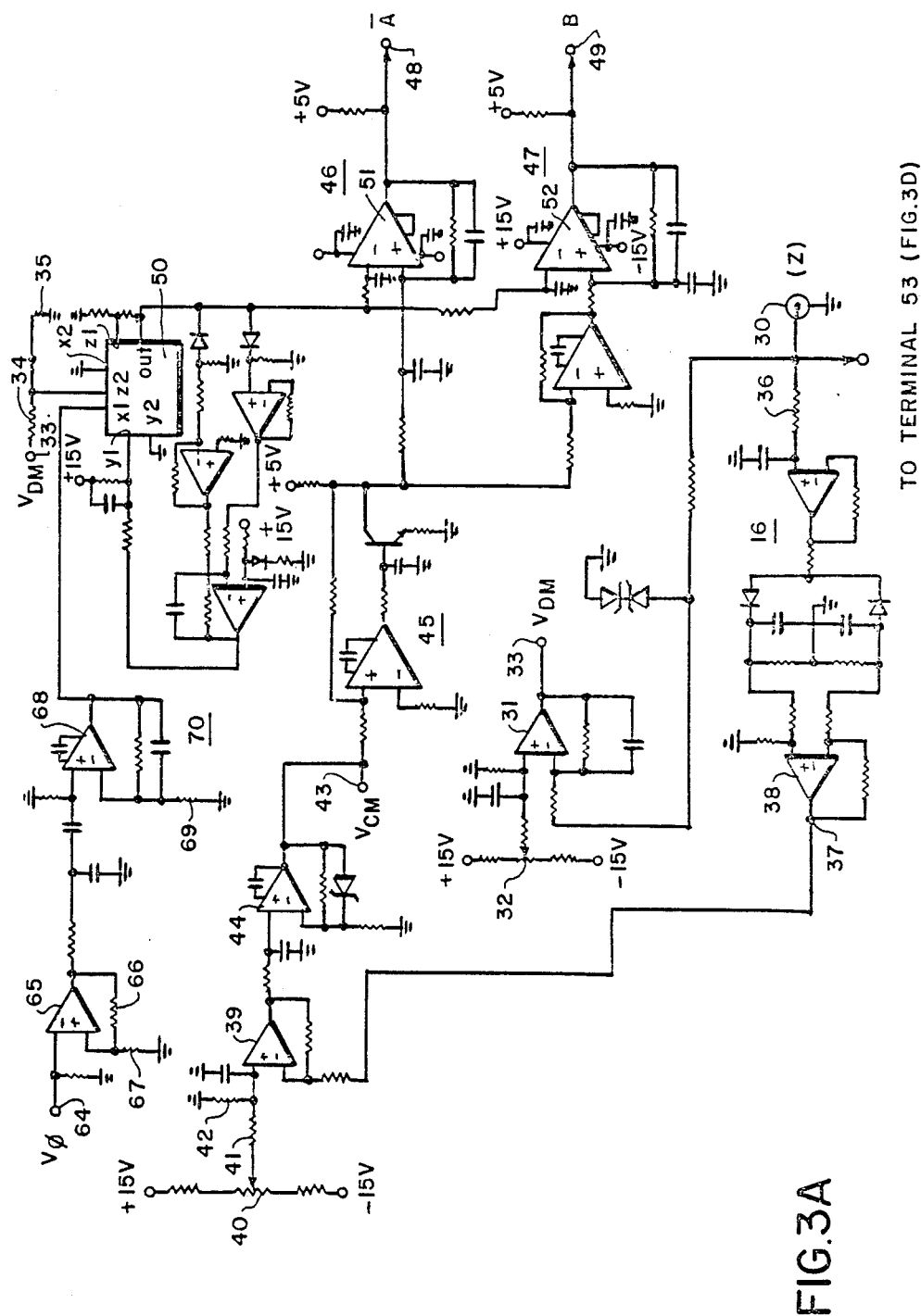

The circuit details of the non-linear control system of FIG. 1 are shown in FIGS. 3A-3D. The sinusoidal position signal (z) from the LVDT axial position sensor (not shown) is applied to input terminal 30 (FIG. 3A). This signal is coupled to the inverting input (−) of a differential amplifier 31. The DC reference signal, i.e. the DC position control voltage, is applied to the non-inverting input (+) of amplifier 31 from a variable tap on a potentiometer 32 connected to the positive and negative terminals of the DC supply voltage, $+V_{cc}$ and $-V_{cc}$, e.g. $+15V$ and $-15V$. The DC reference voltage can be varied by adjustment of the potentiometer 32.

The differential amplifier 31 together with the resistors and capacitors coupled thereto function as the averaging circuit 13 of FIG. 1 to provide the $V_{DM}$ signal at the circuit point 33. The $V_{DM}$ signal is coupled to one input of the AD 534 integrated circuit 50 via a resistor 34, which forms a voltage divider to ground with resistor 35. The foregoing circuit makes up the first feedback control loop.

The position signal at terminal 30 is also applied to the second feedback control loop, i.e. to the inprt of the peak detector 16 via a resistor 36. The AC amplitude signal at the output 37 of the differential amplifier 38 of the peak detector is coupled to the inverting input (−) of a differential amplifier 39 where it is compared with the AC reference signal. The AC reference signal is developed at the wiper arm of a variable potentiometer 40 and is applied to the non-inverting input (+) of amplifier 39 via a voltage divider 41, 42. The potentiometer 40 also is connected between the positive and negative DC supply terminals and provides amplitude control by the manual adjustment of the wiper arm.

The output of amplifier 39 is coupled to the $V_{CM}$ terminal 43 via an amplifier 44. The $V_{CM}$ signal at terminal 43 is modified in the circuits 45, 46 and 47 to appear as first and second rectangular waveform signals at terminals 48 and 49. The output of the IC 50 is coupled to the inverting inputs of differential amplifiers 51 and 52 of the circuits 46 and 47, respectively. The terminals 48 and 49 of FIG. 3A are directly connected to terminals 48 and 49 of the opto-isolated gate drive circuits of FIG. 3B.

The sinusoidal position signal at terminal 30 is directly connected to terminal 53 (FIG. 3D) at the input of the third feedback control loop which comprises a phase locked loop. The sinusoidal position signal is coupled to the non-inverting (+) input of a differential amplifier 54 connected as a limiter circuit to provide a rectangular waveform signal at the output of amplifier 54. The latter signal represents the phase of the position signal and is applied via the parallel connected capacitors 55 and the RC circuit 56 to the non-inverting input (+) of a phase comparator 57. The inverting input (−) of comparator 57 is connected to ground.

The reference signal, $\phi REF$, is applied to terminal 58 of the phase locked loop. This rectangular waveform clock signal which represents the reference phase is directly applied to the non-inverting input (+) of a second phase comparator 59 which has its inverting input (−) connected to ground via a resistor. The frequency reference signal from terminal 58 is also coupled via a resistor 60 and a capacitor 61 to the inverting (−) and non-inverting (+) inputs, respectively, of a phase shifter differential amplifier 62 having a feedback resistor 63 connected between an output thereof and the inverting input.

The signal $V_\phi$ appears at the output 64 of the phase shifter, which is directly connected to the terminal 64 in FIG. 3A. This signal is applied to the inverting input (−) of an amplifier 65. The output of amplifier 65 is connected to its non-inverting input (+) via a voltage divider consisting of resistors 66 and 67.

The output of amplifier 65 is capacitively coupled to the non-inverting input of differential amplifier 68. The inverting input (−) is connected to ground via a resistor 69 and to its output via a parallel RC circuit 70. Ihe output of amplifier 68 is directly connected to the $X_1$ input of IC 50.

Figure 3B:
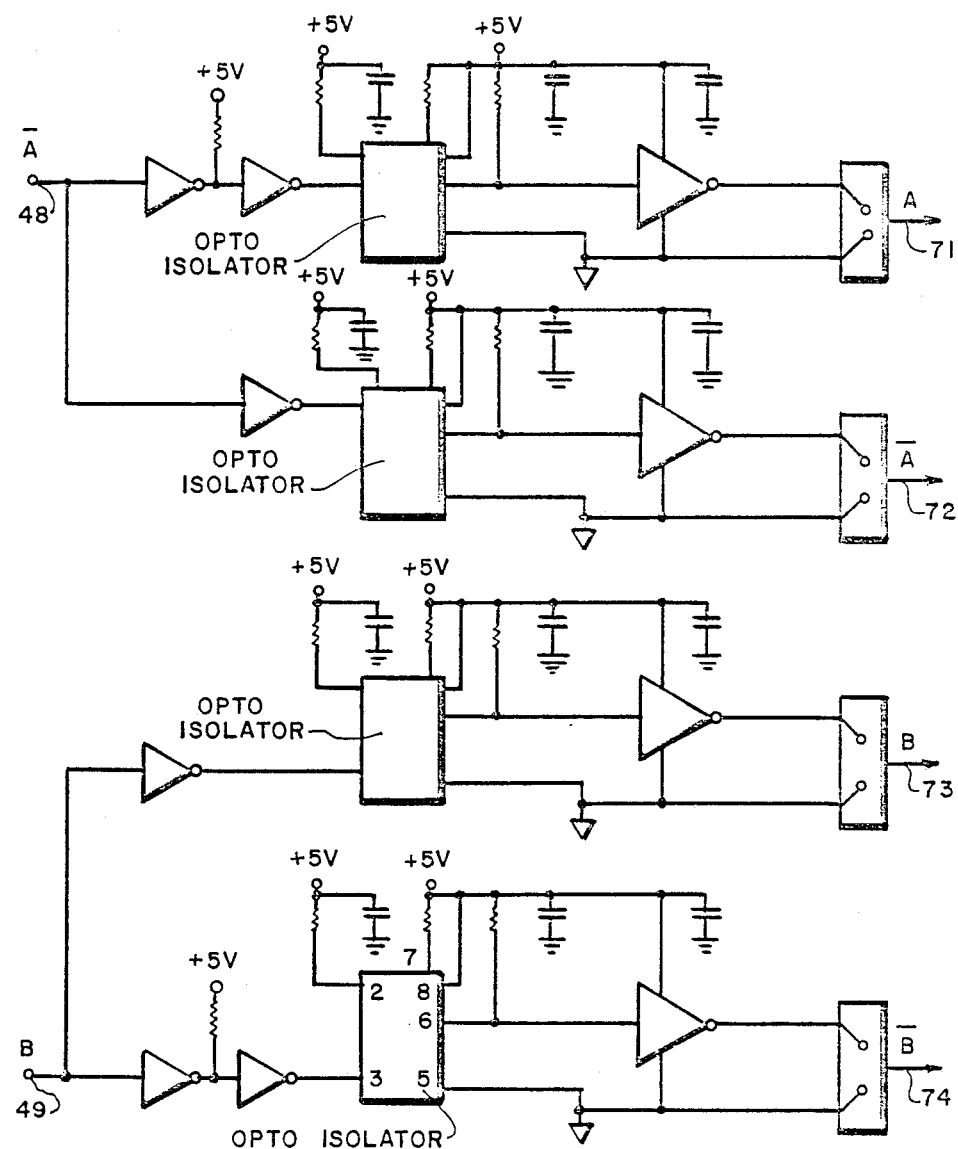
Figure 3D:
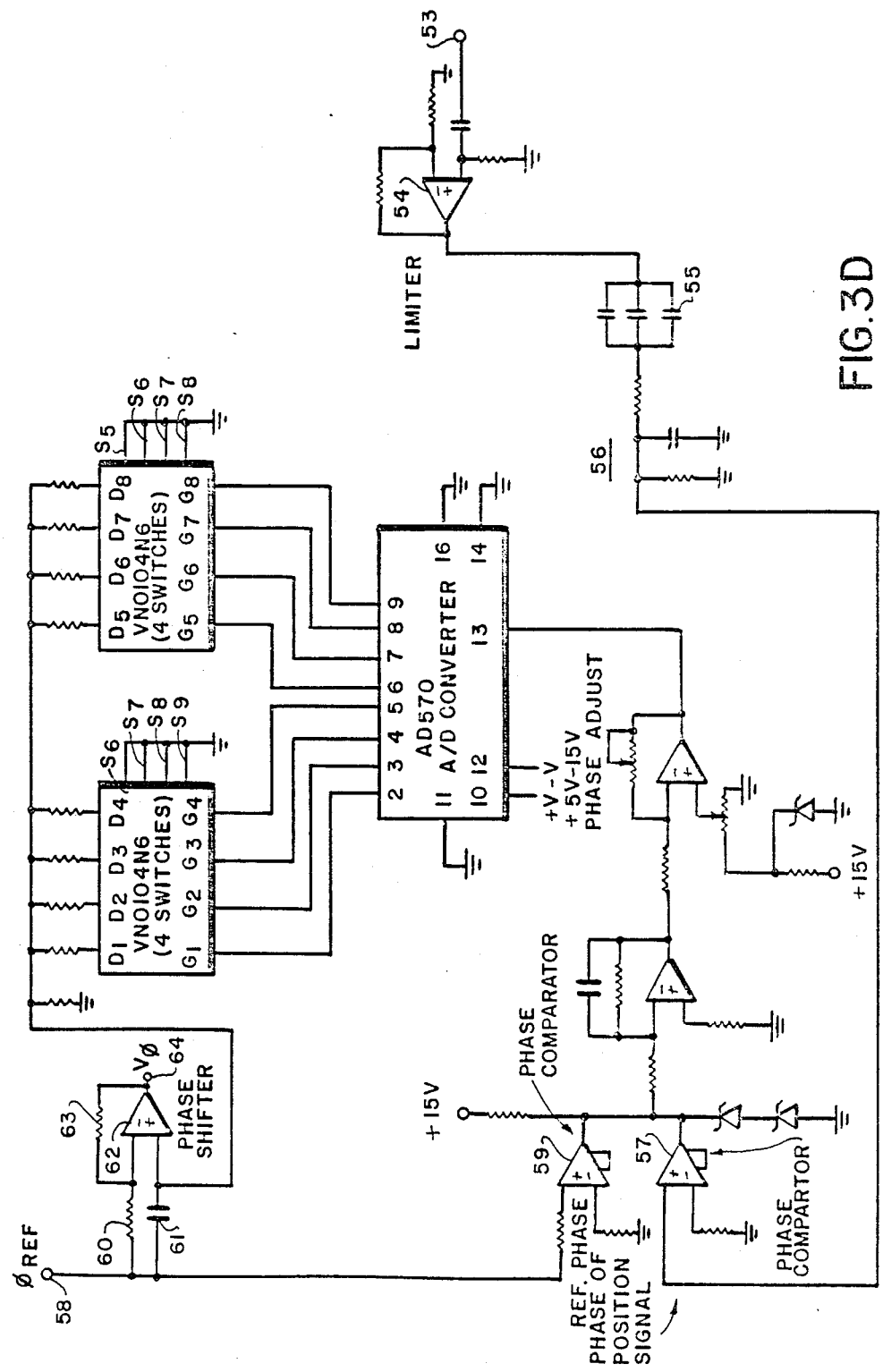

As mentioned above, the rectangular waveform signals at terminals 48 and 49 are directly connected to the terminals 48 and 49 of the opto-isolated gate drive circuits of FIG. 3B. This circuit in turn has four output lines 71, 72, 73 and 74. The output lines 71 and 72 are directly connected to input terminals 75 and 76, respectively, of the power switching circuit of FIG. 3C. The output lines 73 and 74 are in turn directly connected to input terminals 77 and 78, respectively, of the power switching circuit of FIG. 3C. The tri-state switching waveform for driving the motor is developed at output terminals 79, 80 of the power switches.

The novel control concept described above has been successfully applied to a high power reciprocating linear motor system. The non-linear control system makes use of stable limit-cycle theory and phase locked loop control to make possible the use of a highly efficient and simplified tri-state switching circuit. The system exhibits excellent control of the critical operating parameters with negligible distortion of the desired sinusoidal motion or position (FIG. 2) and a good tolerance to noise and distortion of the position sensor signal. This control system can be used for linear and other reciprocating motors which require high efficiency, high reliability and simplicity.

It is to be understood that the above-described system is illustrative of the principles of the invention and that modifications may be devised by those skilled in the art without departing from the spirit and scope of the invention.

What is claimed is:

1. A control system comprising:
 a switching amplifier having first, second and third inputs and an output for supplying to a motor a drive signal having a tri-state switching waveform,
 a first feedback control loop having an averaging circuit with an input coupled to a terminal which receives a motor position signal and an output for deriving a DC position signal,
 first means for combining said DC position signal with a DC reference signal indicative of the desired motor position to produce a first resultant error signal at an output of the first combining means,
 means for coupling said first input of the switching amplifier to the output of the first combining means,
 a second feedback control loop including a peak detector having an input which receives said motor position signal and an output for deriving an AC amplitude signal,
 second means for combining said AC amplitude signal with an AC reference signal indicative of the desired stroke amplitude of the motor to produce a second resultant error signal at an output thereof,
 means for coupling said second input of the switching amplifier to the output of the second combining means,
 a third feedback control loop including a phase locked loop circuit having a first input which receives the motor position signal, a second input for receiving a phase reference signal and an output for supplying a periodic signal at the motor frequency and which determines the phase of the tri-state switching waveform, and
 means for coupling the third input of the switching amplifier to the output of the phase locked loop.

2. A control system as claimed in claim 1 wherein the switching amplifier includes means responsive to said first and second error signals for modulating the pulse width of the tri-state switching waveform, and means responsive to the periodic signal at said third input for controlling the phase of the tri-state switching waveform.

3. A control system as claimed in claim 1 further comprising means for coupling said switching amplifier output to a reciprocating motor.

* * * * *